United States Patent

[11] 3,572,789

| [72] | Inventors | Robert M. McClintock;<br>Howard T. Knox, Northridge, Calif. |
|---|---|---|
| [21] | Appl. No. | 817,058 |
| [22] | Filed | Apr. 17, 1969 |
| [45] | Patented | Mar. 30, 1971 |
| [73] | Assignee | Fridair Industries<br>Redondo Beach, Calif. |

[54] LATCH
12 Claims, 6 Drawing Figs.

| [52] | U.S. Cl. | 292/114, 292/128 |
|---|---|---|
| [51] | Int. Cl. | E05c 5/00 |
| [50] | Field of Search | 292/113, 114, 126, 128, 109, 110, 112, (TC), (LOF), (U), 376, 66, 67, 106, 240—242 |

[56] References Cited
UNITED STATES PATENTS

| 2,497,982 | 2/1950 | Deyo | 292/113 |
| 2,732,238 | 1/1956 | Dornberg | 292/113 |
| 2,955,861 | 10/1960 | Claud-Mantle | 292/113 |
| 3,194,595 | 7/1965 | Wheeler et al. | 292/113 |

*Primary Examiner*—Marvin A. Champion
*Assistant Examiner*—Robert L. Wolfe
*Attorneys*—Smyth, Roston and Pavitt, Arthur W. Fuzak and Donald J. Ellingsberg

ABSTRACT: A latch including a housing and first and second interlockable fastening elements. The first fastener element is mounted on a drive shaft which is rotatably mounted within the housing. A safety lock is mounted in the housing to prevent movement of the first fastener element to a locked position unless the second fastener element is in position to be engaged by the first fastener element.

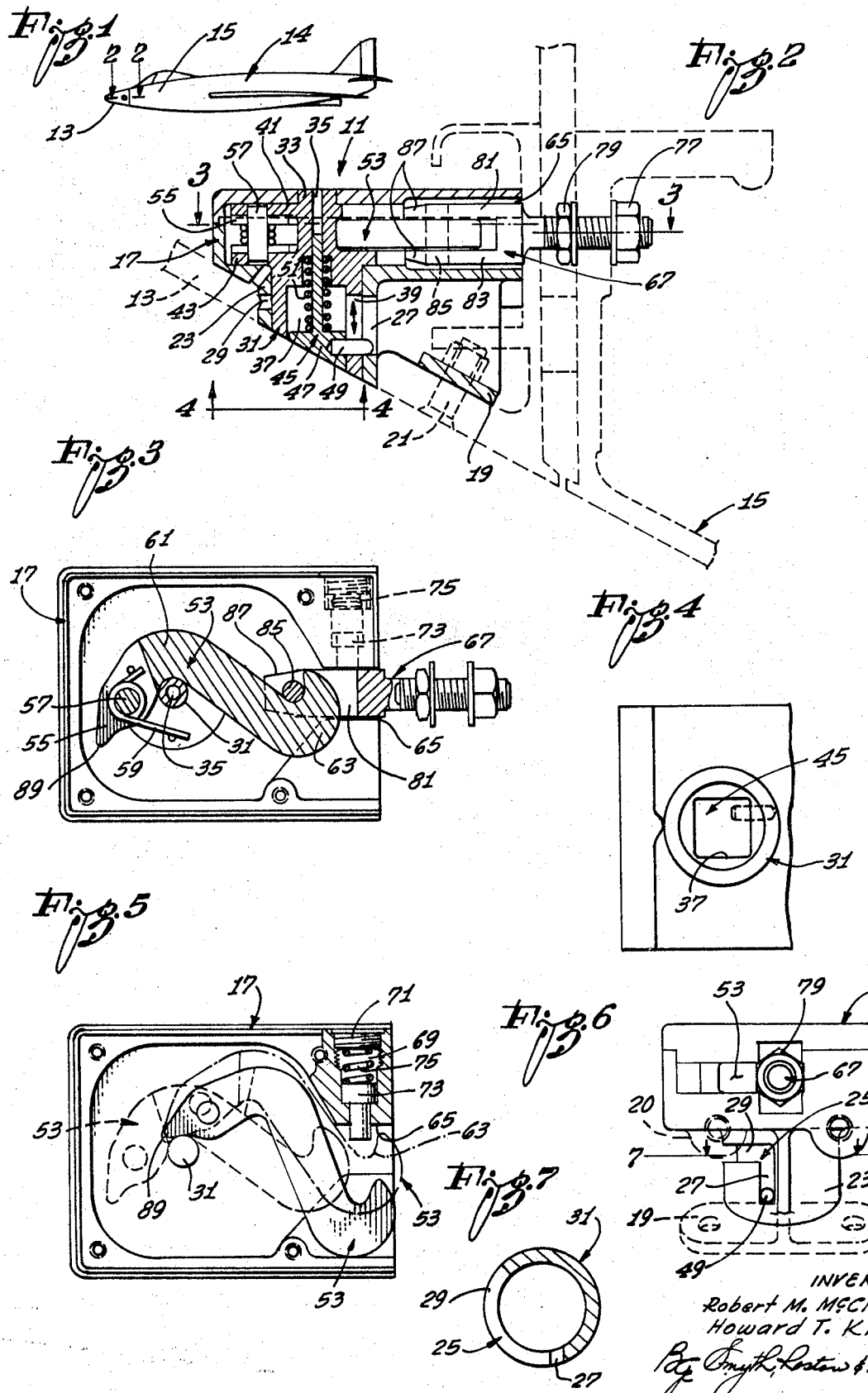

LATCH

BACKGROUND OF THE INVENTION

Frequently latches are used to releasably interconnect various parts of an aircraft such as a radome and the fuselage of the aircraft. When a latch is so used, it should be flush with the aircraft surface so as to avoid breaking of the streamlined aircraft contour. The latch should be small and lightweight so as not to add significantly to the weight penalty of the aircraft.

One prior art flush-type latch uses a rotatable wedge element to lockingly engage a clevis pin. The wedge element cams the clevis pin to a locked position. One problem with this construction is that the camming action of the wedge element against the clevis pin is resisted by substantial friction forces so that operation of the latch is made difficult. Secondly, it is difficult to obtain a significant amount of draw with a relatively small latch utilizing the camming principles of this prior art latch. Finally, this prior art latch is sometimes made difficult to operate by ice and grit which may accumulate on the cam surfaces.

Another problem in the design of a good latch is the result of the latch elements normally being hidden from view so that the operator or workman cannot ascertain from a visual inspection whether or not the latch is locked. Many latches have handles or other members when are visible to the workman and are in a predetermined position when the latch is locked. Normally the handle or other member is drivingly connected to one of the fastener elements and indicates when such fastener element has reached its locked position. However, in the event that the fastener element which is drivingly connected to the handle does not lockingly engage the other of the fastener elements of the latch, there is nothing to prevent the first fastener element from being moved by the handle to the locking position. Under these circumstances, the handle provides a false indication that the latch is locked when in fact the two fastener elements have not been engaged.

In an effort to overcome this problem, one prior art latch utilized a relatively complex safety device which is slidably mounted on one of the fastener elements. In addition to being complex, this safety device is subject to jamming or binding on the fastener element on which it is mounted.

SUMMARY OF THE INVENTION

The present invention provides a latch which can be flush mounted and which accomplishes the latching function without any camming action of the fastener elements. Thus, the latch can be operated with a minimum of friction. In addition, the length of draw of the latch is relatively large in relation to the overall dimensions of the latch, and the latch is not subject to becoming difficult to operate as a result of operation in a dirty environment.

These concepts can be advantageously embodied in a latch which includes a supporting structure and first and second fastening elements. A drive shaft is rotatably mounted on the supporting structure and the first fastener element is pivotally and eccentrically mounted on the drive shaft. The first fastener element is movable by the drive shaft between a locked position in which the fastener elements lockingly interengage and a released position in which the fastener elements lockingly are released from each other. The first fastener element preferably has a hook adjacent an the end thereof remote from the drive shaft. The locking engagement between the fastener elements is accomplished without any camming action between such elements and thus, the latch is made easier to operate.

Another feature of the present invention is that the first fastener element is prevented from moving to the locking position if the second fastener element is not in position to be locking engaged by the first fastener element. This is accomplished without mounting of a safety lock on either of the fastener elements. The present invention provides safety lock means for preventing movement of the first fastener element from the releasing position to the locking position when the second fastener element is not in position to be lockingly engaged by the first fastener element. Means are also provided for moving the safety lock means out of the way of the first fastener element in response to positioning of the second fastening element in the extended position, i.e., the position in which it is lockingly engageable with the first fastener element as the latter moves toward the locking position.

These concepts can be advantageously embodied in a latch in which the first fastener element is movable along a predetermined path from the releasing position to the locking position. The safety lock means preferably includes a safety lock resiliently biased toward the path of movement of the first fastener element to obstruct movement of the first fastener element from the released position to the locked position. The safety lock can advantageously be moved out of the path of movement of the first fastener element by positioning of the second fastener element in the extended position.

The invention, both as to its organization and method of operation together with further features and advantages thereof, may best be understood by reference to the following description taken in connection with the accompanying drawings.

BRIEF DESCRIPTION OF THE DRAWINGS

FIG. 1 is an elevational view of an airplane utilizing a latch constructed in accordance with the teachings of this invention.

FIG. 2 is a sectional view taken along line 2-2 of FIG. 1 and illustrating the latch being utilized to interconnect portions of the aircraft.

FIG. 3 is a sectional view taken along line 3-3 of FIG. 2 and illustrating the latch in a locked position.

FIG. 4 is a fragmentary elevational view taken along line 4-4 of FIG. 2.

FIG. 5 is a view similar to FIG. 3 with the several positions of the latching arm being illustrated.

FIG. 6 is an end elevational view of the latch taken from the right-hand side of the latch as viewed in FIG. 2.

FIG. 7 is a sectional view taken along line 7-7 of FIG. 6.

DESCRIPTION OF THE PREFERRED EMBODIMENT

Referring to the drawings and in particular to FIGS. 1 and 2 thereof, reference numeral 11 designates a latch constructed in accordance with the teachings of this invention and utilized to interconnect two members of an airplane 14 such as a nose section or radome 13 and the fuselage 15. As shown in FIG. 2, the exterior surfaces of the member 13 an and the fuselage 15 are smooth and substantially continuous and the latch 11 is flush with the exterior surface of the member 13.

The latch 11 includes a housing 17 which may be constructed of two or more parts. The housing 17 has two pair of flanges 19 (FIGS. 2 and 6) and 20 (FIG. 6). Threaded fasteners 21 project through the flanges 19 and other suitable fasteners (not shown) project through the flanges 20 to rigidly secure the housing to the member 13. The flanges 20 carry most of the load. As shown, the fasteners 21 are countersunk so that the head thereof is flush with the peripheral surface of the member 13. The housing 17 has a tubular section 23 (FIGS. 2 and 6) which terminates outwardly in a surface which is flush with the peripheral surface of the member 13 as shown in FIG. 2. The tubular section 23 has a slot 25 with an axially extending slot portion 27 and a circumferentially extending slot portion 29 (FIGS. 2, 6 and 7).

The latch 11 also includes a drive shaft 31 which is rotatably mounted within the tubular section 23 of the housing 11 and within an opening 33 opposite the tubular section 23 (FIG. 2). The drive shaft 31 has an axial passage 35 extending therethrough with the end of the passage 35 within the tubular section 23 being relatively large and square in radial cross section to define a socket 37 (FIGS. 2 and 4). The drive shaft 31 has an axially extending slot 39 in registry with the axially slot portion 27 of the slot 25 when the latch is in the locked position shown in FIG. 2. The drive shaft 31 has a pair of axially spaced integral lugs 41 and 43 positioned axially inwardly of the socket (FIG. 2).

A plunger 45 (FIGS. 2 and 4) is mounted for axial sliding movement within the passage 35 of the drive shaft 31. The plunger 45 has an enlarged head 47 which is square in radial cross section so as to drivingly engage the socket 37. The head 47 carries a pin 49 which is sized to ride in the slots 39, 27 and 29 and is of sufficient length to project from the head 47 through the slot 39 and into the slot 27 to thereby lock the drive shaft 31 in position. A spring 51 urges the plunger 45 axially outwardly to the position shown in FIG. 2 in which the outer surface thereof is flush with the drive shaft 31 an and the adjacent portions of the member 13. To rotate the drive shaft 31, it is necessary to move the plunger 45 axially inwardly against the biasing force of the spring 51 until the pin 49 comes into registry with the circumferentially extending slot portion 29, at which point the drive shaft can be rotated in the direction permitted by the slot portion 29.

A fastener element in the form of a latching arm 53 has a bifurcated end portion 55 which fits between the lugs 41 and 43 and is pivotally mounted thereon by a stub shaft 57 (FIGS. 1 and 3). A spring 59 is coiled about the stub shaft 57 and biases the latching arm 53 in a counter clockwise direction as viewed in FIG. 3. The latching arm 53 is generally in the form of a mirror image of an S and includes a 90° bend portion 61 and a hook 63 formed at the opposite end of the latching arm from the bifurcated end 55. In the locking position shown in FIG. 3, the interior of the bend portion 61 abuts the drive shaft 31 as shown in FIG. 3.

As shown in FIGS. 2, 3 and 5, the housing 17 is formed with an opening 65 into which a second fastener element which, in the embodiment illustrated, is in the form of an eyebolt 67 can project. The housing 17 has a small chamber 69 (FIG. 5) therein, one end of which opens in the opening 65 and the other end of which is normally closed by a threaded plug 71. A safety lock 73 is mounted for movement within the chamber 69 and is biased outwardly toward a safety or blocked position by a coil spring 75 as shown in FIG. 5. In the safety position a portion of the safety lock 73 projects into the opening 65. The spring force on the safety lock 73 can be adjusted by adjusting the degree to which the plug 71 is turned into the chamber 69.

The eye bolt 67 if mounted on the fuselage 15 by a pair of nuts 77 and 79 as shown in FIG. 2. The eyebolt includes a pair of spaced members 81 and 83 with a pin 85 mounted thereon and extending therebetween.

In the locked position of the latch 11, the pin 85 of the eyebolt 67 is snugly engaged by the hook 63 of the latching arm 53 as shown in FIGS. 2 and 3. The lock thus formed is an overcentered toggle lock. Specifically, the axis of the stub shaft 57 about which the latching arm 53 is pivoted lies beneath a line drawn between the axes of the pin 85 and the drive shaft 31. Thus, any force tending to move the eyebolt 67 and the latching arm 53 in opposite directions will result in a tendency to further tighten the latch 11.

The latch 11 is also held in the locked position by the pin 49 which extends through the slot 39 and into the slot 27. Thus, the pin 49 mechanically locks the drive shaft 31 against rotation relative to the housing 17. The combination of the pin 49, the toggle action and the spring 59 prevent inadvertent unlocking of the latch.

To unlock the latch, a tool is inserted into the socket 37 of the drive shaft 31 thereby moving the plunger 45 axially inwardly against the biasing action of the spring 51. The pin 49 is carried axially inwardly with the plunger 45 until the pin is in registry with the circumferentially extending slot 29 in the housing 17.

At this time, the tool can be turned to rotate the drive shaft 31 clockwise as viewed in FIG. 3. Such 1 clockwise rotation of the drive shaft 31 moves the pin 57 and the bifurcated end portion 55 of the latching arm 53 through a predetermined arc. In the embodiment illustrated, the slot 29 extends through approximately 135°, it being understood that other lengths of the slot 29 may be employed. Such rotation of the drive shaft 31 moves the latching arm 53 from the locking position shown in FIG. 3 to the releasing position shown in full lines in FIG. 5. In the releasing position, the hook 53 is disengaged from the eyebolt 67 and the eyebolt and the latching arm 53 can be separated.

The spring 59 tends to pivot the latching arm 53 counterclockwise about the stub shaft 57 as viewed in FIGS. 3 and 5. This further tends to maintain the latching arm 53 lockingly engaged with the eyebolt 67. The spring 59 would actually prevent disengagement of the latching arm 53 and the eyebolt 67 as the drive shaft rotates the latching arm from the locking position toward the releasing position. Accordingly, the bifurcated portion 55 of the latching arm 53 is formed with the projecting cam 89 (FIGS. 3 and 5) which engages the drive shaft 31 just prior to the releasing position whereupon further rotational movement of the drive shaft 31 toward the releasing position causes the cam 89 to beat bear against the drive shaft 31 and pivots the latching arm 53 clockwise to the releasing position. In returning the latching arm 55 toward the locking position, the first increment of motion frees the cam 89 from the drive shaft 31 to thereby permit the spring to bias the latching arm 53 counterclockwise about the stub shaft 57 and upwardly toward the pin 85.

The plunger 45 is retained in the axial inward position by the pin 49 which is received within the circumferential slot 29. The plunger 45 is in such axial inward position when the latching arm 53 is in the releasing position (FIG. 5) and is flush with the adjacent outer surface of the drive shaft 31 when the latching arm is in the locked position (FIGS. 2 and 3). Thus, the plunger 45 provides a visual indication of the locking and releasing positions of the latch. This is very desirable because in ordinary usage, the latching arm 53 and the eyebolt 67 are concealed from the operator and so such a visual indicator is necessary in order for the operator to know that the latch has been locked.

It will be appreciated, however, that without the safety lock 73, the operator could move the latching arm 53 to the locking position shown in FIG. 3 even though the eyebolt 67 were not inserted into the opening 65. In this event, the plunger 45 would indicate that the latch was locked when in fact no locking affect as obtained because of the improper positioning of the eyebolt 67.

The present invention solves this problem by providing, in the specific embodiment illustrated, the safety lock 73 which is biased outwardly to the position shown in FIG. 5 when the latch is in the releasing position. Should the drive shaft 31 be rotated to move the latch 53 from the releasing position (FIG. 5) toward the locking position (FIG. 3), the latching arm 53 would move to the intermediate position shown with intermittent long and short lines in FIG. 5 in which the hook 63 would engage the projecting end of the safety lock 73 whereupon further rotational movement on the drive shaft 31 would be prevented. The spring 59 biases the hook 63 counterclockwise so that engagement between the hook and safety lock 73 will occur. Such interengagement of the hook 63 and the safety lock 73 occurs with the pin 49 in the circumferential slot 29 and before the pin 49 has become aligned with the axial slot 27. Thus, the cessation of rotational movement of the drive shaft 31 occurs with the plunger 45 in the depressed or axial inward position so that it provides an indication that the latch has not been locked. Furthermore, as further rotational movement of the drive shaft 31 in a direction tending to lock the latch is prevented by the safety lock 73, the operator is advised that the eyebolt is not in proper position to lockingly engage the hook 63.

Assuming now that the eyebolt 67 is properly inserted into the opening 65, an inclined cam surface 87 on the end portions of the members 81 and 83 cams the safety lock into the chamber 69 so that it can no longer obstruct the movement of the latching arm 53 from the releasing to the locking position. The components of the latch are sized and configured so that the safety lock 73 will not be cammed out of the position in which it can effectively obstruct movement of the latching arm 53 until the pin 85 lies in the path of movement of the latching arm so that it can be lockingly looked thereby. Continued rotational movement of the drive shaft 31 following locking engagement of the hook 63 and the eyebolt 67 causes the hook 63 to draw the eyebolt 67 toward the drive shaft 31 thereby providing a tight connection.

Although an exemplary embodiment of this invention has been shown and described, many changes, modifications, and substitutions may be made by one having ordinary skill in the art without necessarily departing from the spirit and scope of this invention.

We claim:

1. A latching comprising:
    a supporting structure;
    a first fastener element having a hook adjacent one end thereof;
    a second fastener element lockingly engageable with the first fastener element;
    a drive shaft rotatably mounted on said supporting structure and having a socket therein for receiving a tool to rotate said drive shaft, said first fastener element being eccentrically mounted adjacent the other end thereof on said drive shaft and being movable by said drive shaft between a locked position in which the hook lockingly engages the second fastener element and a released position in which the second fastener element is released from said hook, said second fastener element being drawn toward said first fastener element by said first fastener element without camming of said second fastener element as the first fastener element moves from said released position to said locked position; and
    releasable means extending between the supporting structure and the drive shaft in said locked position for releasably locking the drive shaft in said locked position for releasably locking the drive shaft in said locked position, said releasable means includes a plunger slidable in said socket between an inner position and an outer position and a locking member carried by said plunger, said locking member being engageable with said supporting structure and being held against rotation by said supporting structure when said plunger is in said outer position and said first fastener element is in said locked position.

2. A latch as defined in claim 1 wherein said drive shaft and said fastener elements form an overcenter toggle lock.

3. A latch as defined in claim 1 including means responsive to a failure of the fastener elements to lockingly engage after a predetermined amount of movement of said first fastener element from said releasing position toward said locking position.

4. A latch comprising:
    a supporting structure;
    a first fastener element;
    a second fastener element movable between an extended position in which the first fastener element is engageable therewith and a retracted position in which the second fastener element is too remote from said first fastener element to be engageable therewith;
    means on said supporting structure for moving said first fastener element between a locking position in which the first fastener element lockingly engages said second fastener element and a releasing position in which the second fastener element is released from said first fastener element;
    a safety lock movably mounted on said supporting structure for movement between a blocked position in which said safety lock prevents movement of said first fastener element from said releasing position to said locking position and an unblocked position in which said safety lock allows movement of said fastener element from said releasing position to said locking position; and
    means for driving said safety lock from said blocked position to said unblocked position in response to movement of said second fastener element from said retracted position to said extended position whereby said first fastener element can be moved to said locking position only when the second fastener element is in said extended position.

5. A latch as defined in claim 4 including indicator means mounted on said supporting structure and movable to a first position in response to said first fastener element being in said locked position, said indicator means being visible from the exterior of the latch.

6. A latch as defined in claim 4 wherein said means for driving includes said second fastener element.

7. A latch as defined in claim 4 wherein said last mentioned means includes a camming surface on at least one of said safety lock and said second fastener element, said second fastener element being engageable with the safety lock to cam the safety lock to said unblocked position as said second fastener element is moved from said retracted position to said extended position.

8. A latch comprising:
    a supporting structure;
    a first fastener element;
    a second fastener element movable to an extended position in which the first fastener element is engageable therewith;
    means for mounting said first fastener element on said supporting structure for movement along a predetermined path from a released position in which said second fastener element is released from said first fastener element and a locked position in which the first fastener element lockingly engages the second fastener element;
    a safety lock movably mounted on said supporting structure;
    means for urging said safety lock into said predetermined path to thereby block movement of the first fastener element in moving from said released position to said locked position; and
    means responsive to said second fastener element being in said extended position to move said safety lock against the force of said urging means out of said predetermined path to thereby permit movement of said first fastener element to said locking position.

9. A latch as defined in claim 8 wherein said supporting structure includes a housing having an opening therein through which at least a portion of said second fastener element projects in said extended position thereof, said safety lock being mounted in said housing and projecting into the path of movement of said second fastener element as said second fastener element is extended through said opening in said housing, and said last mentioned means includes a camming surface on at least one of said second fastener element and said safety lock to permit said second fastener element to cam said safety lock out of said predetermined path to thereby permit the first fastener element to lockingly engage the second fastener element and to permit movement of said fastener elements to said locked position.

10. A latch as defined in claim 8 wherein said means for mounting said first fastener element includes biasing means for applying a force to said first fastener element and influencing the configuration of said predetermined path.

11. A latch as defined in claim 8 wherein the second fastener element engages the safety lock in moving to said extended position to thereby urge the safety lock out of said predetermined path.

12. A latch for interconnecting first and second members comprising:
    a supporting structure including a housing connectable to the first member, said housing having an opening therein;
    a latching arm mounted within said housing;
    a fastener element connectable to the second member and extendible through said opening of said housing to an extended position, said latching arm being lockingly engageable with said fastener element;
    a drive shaft rotatably mounted on said housing for a movement about a first pivotal axis, said latching arm being pivotally and eccentrically connected to said drive shaft about a second rotational axis which is generally parallel to and spaced from said first rotational axis whereby rotational movement of said drive shaft imparts movement to said latching arm, said drive shaft being rotatable to move said latching arm between a releasing position in which the fastener element is released from said latching arm and a locking position in which said locking arm lockingly engages the fastener element and said fastener element is drawn toward said drive shaft, said fastener element in said extended position thereof lying in the path of movement of said latching arm as the latching arm moves between said positions thereof;

a safety lock movably mounted on said housing;

first biasing means for urging said safety lock to a position in which it lies in the path of movement of said fastening element as said fastening element moves to said extended position thereof;

second biasing means for urging said latching arm into engagement with said safety lock in move moving from said releasing position to said locking position when said fastener element is out of said extended position thereof, the engagement between said latching arm and said safety lock preventing the movement of said latching arm to said lock position; and a camming surface on at least one of said safety lock and said fastener element for permitting said fastener element to cam said safety lock to an unobstructing position as said fastener element is moved into said extended position, said latching arm being movable from the releasing position to the locking position when said safety lock is in said unobstructing position.

UNITED STATES PATENT OFFICE
CERTIFICATE OF CORRECTION

Patent No. 3,572,789                    Dated March 30, 1971

Inventor(s) Robert M. McClintock; Howard T. Knox

It is certified that error appears in the above-identified patent and that said Letters Patent are hereby corrected as shown below:

Assignee should be Tridair Industries instead of Fridair Industries

Signed and sealed this 2nd day of May 1972.

(SEAL)
Attest:

EDWARD M. FLETCHER, JR.					ROBERT GOTTSCHALK
Attesting Officer					Commissioner of Paten

FORM PO-1050 (10-69)